Sept. 29, 1959        H. C. RIGGS        2,906,806
VENT PLUG
Filed Sept. 6, 1955
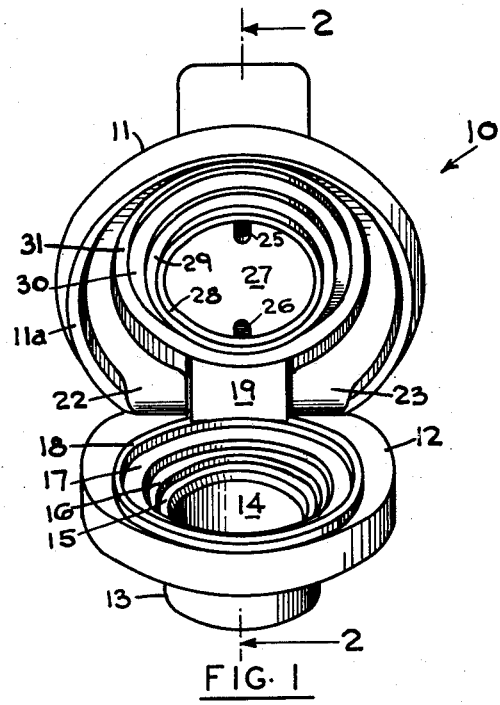
FIG. 1
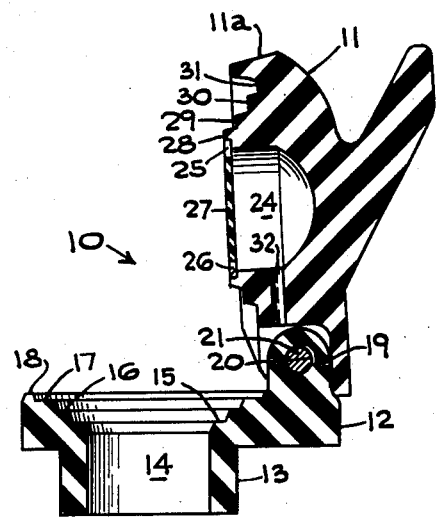
FIG. 2
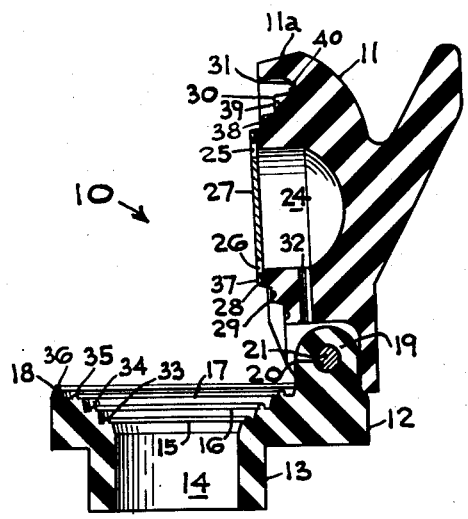
FIG. 4
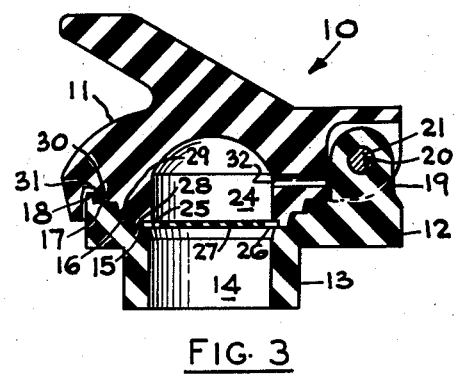
FIG. 3
INVENTOR.
HAROLD C. RIGGS
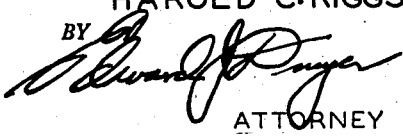
ATTORNEY

United States Patent Office 2,906,806
Patented Sept. 29, 1959

2,906,806

VENT PLUG

Harold C. Riggs, Langhorne Manor, Pa., assignor to The Electric Storage Battery Company, a corporation of New Jersey Application September 6, 1955, Serial No. 532,480

2 Claims. (Cl. 136—177)

The invention relates to improvements in electric storage batteries and, more particularly, to improvements in the vent plugs used in connection with such batteries.

The vent plug to be hereinafter described and claimed is particularly suitable for use in those storage batteries designed for service in connection with carlighting and air conditioning units on railroad trains, service on industrial trucks, and other fields where excessive vibration is encountered. Additionally, in some of these types of applications, the batteries are usually composed of a large number of cells and the servicing of such batteries with conventional type vent plugs will be extremely time consuming, or even impossible by reason of the lack of head room over the batteries. For such services, so-called hinged type vent plugs, such as exemplified by United States Patent No. 2,673,231 granted to H. A. Kennedy on March 23, 1954 have been heretofore used. Such prior art devices have, however, been susceptible of numerous defects that have now been overcome by my new and improved design.

It is an object of the invention to provide a hinged type vent plug that is simple in design and yet thoroughly effective in operation to prevent either sloppage or spillage of electrolyte from the storage battery cell in connection with which such plug is used.

A further object of the invention is to provide a hinged type vent plug that is readily operable to permit servicing of the battery cell.

Other objects of the invention will be apparent from the description and claims that follow:

In the drawing:

Figure 1 is an front elevational view of the invention showing the plug in an open or servicing position.

Figure 2 is a side sectional view of the invention taken along the lines 2—2 of Figure 1.

Figure 3 is a view similar to Figure 2 showing the plug in the closed or operating position.

Figure 4 is a view similar to Figure 2 showing a modification of the invention.

Referring now to the drawing, the numeral 10 indicates generally the vent plug of my invention comprising two main parts i.e. top member 11 and body portion 12, the latter being provided with a downwardly depending skirt 13 for insertion into the vent opening of a storage battery cell cover (not shown). If desired, skirt 13 can be provided externally with any desirable mechanical means, such as a bayonet type joint or threads for interengaging with similar means formed in the vent opening to secure the plug in place therewithin.

Vent passage 14 extending through skirt 13 and body portion 12 provides communication between the storage battery cell and the interior of vent plug 10. Surrounding the upper portion of vent passage 14 are a plurality of stepped surfaces 15, 16, 17 and 18 respectively, the purpose of which will be hereinafter described. Body portion 12 is further provided with upstanding lug 19 which is horizontally pierced by hinge pin opening 20. Hinge pin 21 extends through said opening 20 and through corresponding openings in ears 22 and 23 on top member 11 to affix said top member to body portion 12.

Top member 11 is formed in a substantially dome shaped configuration and contains central chamber 24 communicating through openings 25 and 26 in baffle 27 with vent passage 14 in body portion 12. Chamber 24 is surrounded by a series of stepped surfaces 28, 29, 30 and 31 respectively that are adapted to abut surfaces 15–18 inclusive formed in body portion 12 when the plug is in the closed or operative position (see Figure 3), thus providing a series of baffles to prevent the splashing or creepage of electrolyte between top member 11 and body portion 12. The top member is also provided with a downwardly extending lip 11a adapted to fit closely around surface 18 on body portion 12 to prevent the entrance of dirt or other impurities between the parts of the plug.

As a result of the above description it will be apparent that there has been provided a vent plug of a new and improved design which will function effectively to prevent loss of electrolyte from the cell either by way of splashing or by creepage up the inner walls of the plug. Such result does not depend upon any frictional contact between between the top member and body portion which might render it difficult to open and close the plug but upon the abutting of the series of stepped horizontal surfaces. Additionally, when it is necessary that gas be evolved from the cell it can escape through passage 14, openings 25 and 26 in baffle 27, chamber 24, vent hole 32 in top member 11, and around lug 19 to the atmosphere.

In Figure 4 is shown a structural modification of the invention is which stepped surfaces 15–18 inclusive are provided with ridges 33–36 respectively. The stepped surfaces formed in top member 11, namely 28–31 inclusive, are provided with grooves 37–40 respectively, said ridges being designed to be received within said grooves and block off passage of electrolyte between the top member and the body portion when the plug is in a closed or operating position.

The description hereinbefore set forth is intended to be exemplary only. Other forms and variations coming within the scope of the appended claims will occur to those skilled in the art.

I claim:

1. A storage battery vent plug, comprising in combination, a body portion having a filling opening therein, a plurality of annular stepped surfaces in said body portion descending internally into said filling opening, a top member having a central chamber projecting downward therefrom having a plurality of annular stepped surfaces ascending its outer surface, a hinge member connecting said top member to said body portion and arranged to permit said top member to be swung open from a closed position, wherein said stepped surfaces on said central chamber mate with said stepped surfaces on said body portion, to a vertical open position, an opening in said central chamber adapted to communicate said chamber to said filling opening when said top member is in a closed position, and a vent hole communicating said central chamber to the outside at said hinge member.

2. The storage battery vent plug of claim 1 in which each stepped surface of the body portion is provided with a ridge and each stepped surface of the top member is provided with a groove, said ridges being adapted to be received by said grooves when said top member is in a closed position.

References Cited in the file of this patent

UNITED STATES PATENTS

| | | |
|---|---|---|
| 1,441,326 | Blocker | Jan. 9, 1923 |
| 1,977,935 | Caldwell | Oct. 23, 1934 |
| 2,303,578 | Porter | Dec. 1, 1942 |
| 2,480,437 | Berg et al. | Aug. 30, 1949 |
| 2,506,952 | Doughty | May 9, 1950 |
| 2,647,159 | Lighton | July 28, 1953 |
| 2,786,091 | Spellier | Mar. 19, 1957 |